United States Patent [19]
Brede et al.

[11] Patent Number: 5,291,014
[45] Date of Patent: Mar. 1, 1994

[54] PASSIVE SAFETY DEVICE USING OPTICAL SIGNALS FOR CONTROLLING AN AIRBAG SYSTEM OF A VEHICLE, METHOD FOR OPTICALLY TRIGGERING THE PASSIVE SAFETY DEVICE, AND OPTOMECHANICAL ACCELERATION SENSOR

[75] Inventors: Uwe Brede, Fürth; Gerhard Kordel, Nürnberg; Wolfram Seebeck, Veitsbronn; Horst Wellner, Fürth, all of Fed. Rep. of Germany

[73] Assignee: Dynamit Nobel Aktiengesselschaft, Troisdorf, Fed. Rep. of Germany

[21] Appl. No.: 922,861

[22] Filed: Jul. 31, 1992

[30] Foreign Application Priority Data
Aug. 1, 1991 [DE] Fed. Rep. of Germany ....... 4125495
Feb. 1, 1992 [DE] Fed. Rep. of Germany ....... 4202919

[51] Int. Cl.$^5$ .......................... H01J 5/16; G01D 5/34; B60R 21/32
[52] U.S. Cl. ............................. 250/227.21; 250/231.1; 280/735
[58] Field of Search ........... 250/231.1, 231.19, 231.18, 250/227.21, 227.11, 231.11, 231.12, 237 R; 385/12; 280/735, 734

[56] References Cited
U.S. PATENT DOCUMENTS

| | | | |
|---|---|---|---|
| 4,103,155 | 7/1978 | Clark | 250/214 PR |
| 4,493,212 | 1/1985 | Nelson | 250/231.19 |
| 4,737,630 | 4/1988 | Andersson | 250/231.1 |
| 4,928,008 | 5/1990 | Huggins et al. | 250/231.1 |
| 4,988,862 | 1/1991 | Beltz | 250/231.1 |
| 5,037,129 | 8/1991 | Fritz et al. | 280/735 |
| 5,058,920 | 10/1991 | Burger et al. | 280/735 |
| 5,085,464 | 2/1992 | Behr et al. | 280/735 |
| 5,107,245 | 4/1992 | Gesper et al. | 280/735 |
| 5,134,306 | 7/1992 | Schumacher et al. | 280/735 |
| 5,191,208 | 3/1993 | Slemon et al. | 250/227.21 |

Primary Examiner—Michael Messinger
Attorney, Agent, or Firm—Antonelli, Terry, Stout & Kraus

[57] ABSTRACT

A passive safety device comprises a sensor unit for determining vehicle accelerations and decelerations, an evaluating unit for evaluating the output signal of the sensor unit, and a triggering unit for the activation of an occupant protection system upon the reception of a trigger signal, to protect the occupants from injuries. The individual units of the safety device are connected by way of optical lightguides, i.e. the communication among the individual units takes place through optical light signals. The sensor unit has an optical-mechanical acceleration sensor with at least one input lightguide, light being transmitted to the acceleration sensor by way of this lightguide. This light is transmitted within the acceleration sensor to at least one output lightguide. The optical system of the acceleration sensor arranged between the two lightguides is exposed to the accelerations to be detected and changes its optical properties in dependence on the magnitude of the acceleration forces. The output signal of the acceleration sensor, i.e. the light from the at least one output lightguide, is a measure for the effective acceleration and permits either quantitative information or qualitative information (larger than, larger than or equal to, smaller than, smaller than or equal to a predetermined threshold value) regarding the actual acceleration.

47 Claims, 6 Drawing Sheets

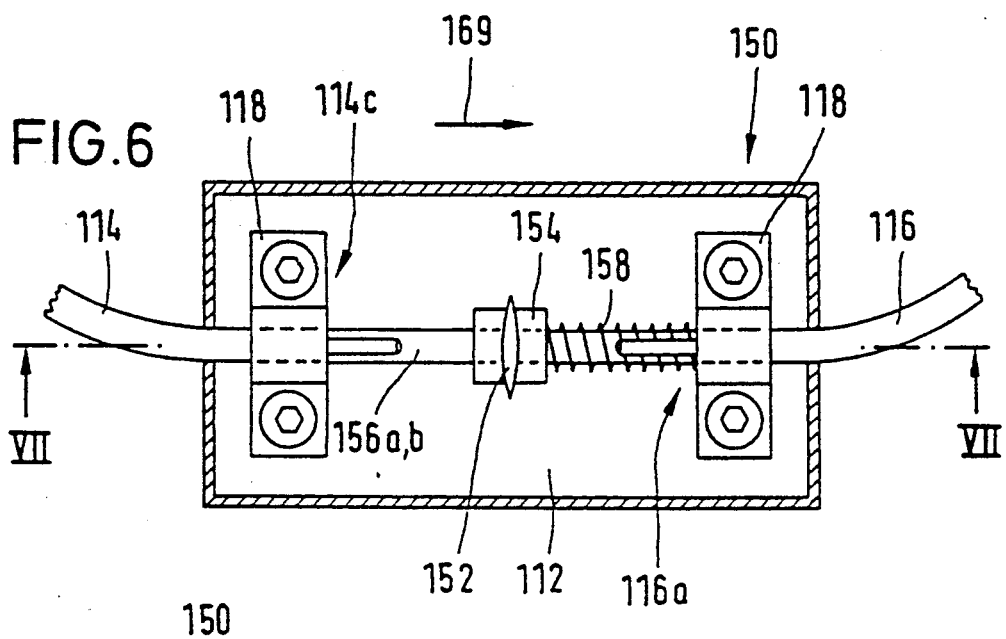
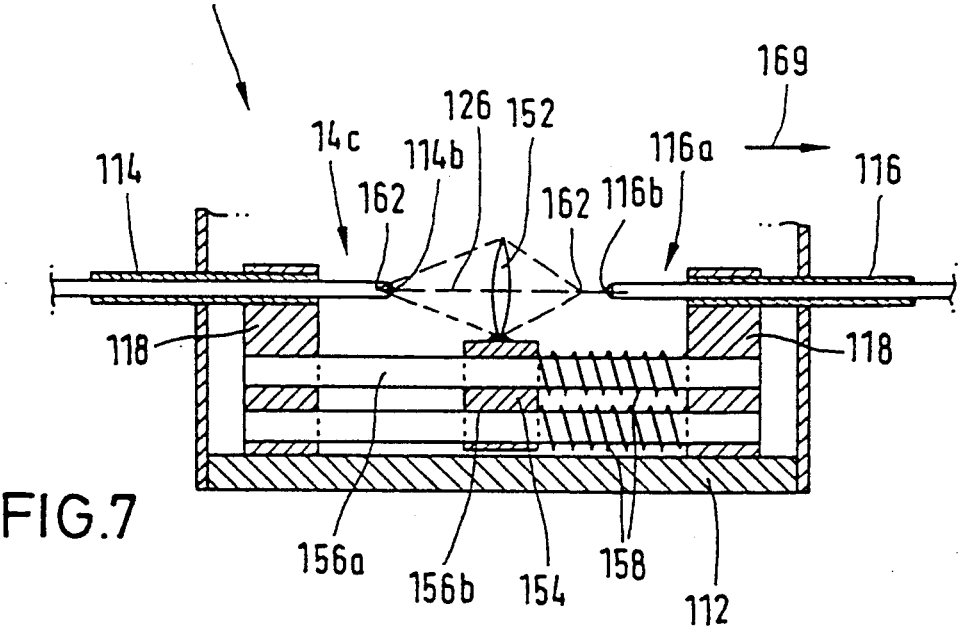

PASSIVE SAFETY DEVICE USING OPTICAL SIGNALS FOR CONTROLLING AN AIRBAG SYSTEM OF A VEHICLE, METHOD FOR OPTICALLY TRIGGERING THE PASSIVE SAFETY DEVICE, AND OPTOMECHANICAL ACCELERATION SENSOR

BACKGROUND OF THE INVENTION

This invention relates to a passive safety device, especially an airbag system, for protecting the occupants of a vehicle, a land vehicle, rail vehicle or the like, from injuries during accidents, which is equipped with a sensor device or unit for detecting the vehicle accelerations and decelerations, an evaluating device or unit connected to the sensor device for evaluating the output signal of the sensor device, and a triggering device or unit connected to the evaluating device for the activation of an occupant protection system upon the reception of a trigger signal to protect the occupants from injuries. Furthermore, the invention concerns a method for triggering such a passive safety device. Finally, the invention also concerns optomechanical acceleration sensors for utilization, in particular, in a passive safety device of the above type and/or in a method for triggering such a safety device.

Passive restraints in automotive vehicles, airplanes and railroad vehicles, as well as methods for triggering such a safety device have been known. The airbag system in an automotive vehicle, for example, is such a passive restraint. In this safety system, upon the occurrence of a specific acceleration or deceleration, detected by a sensor device, the actual occupant safety unit is triggered; this being an airbag to be inflated within a specific predetermined time period. Passive restraints conventionally include the following functional or structural units: A sensor unit or means for detecting the vehicle acceleration and deceleration, an evaluating device unit or means connected to the sensor device for evaluation of the output signal of the sensor device, and a triggering unit or means connected to the evaluating unit for effecting activation of the (actual) occupant safety device to protect the occupants from injuries, upon the reception of a triggering signal. The above three units are sometimes mounted spatially separate in the corresponding vehicle. For example, in an automotive vehicle, the triggering unit is disposed together with the gas generator in the steering wheel or dashboard (glove compartment); whereas the evaluating unit together with the other electronic circuitry of the automotive vehicle is accommodated in a region readily accessible for the purpose of a simple exchange of individual modules, for example in the engine compartment. The sensor unit can be provided at a third location in the vehicle. All of these units are connected with one another by way of electrical cables the signal or data exchange among the individual units takes place electrically. A drawback in this arrangement resides in the susceptibility to failures inherent in the safety system on account of external electromagnetic interference pulses which can be coupled into the system via the electrical connecting lines and can bring about, in the most adverse case, an erroneous triggering of the occupant safety system. A weakening of the interference pulses can be obtained by complicated and expensive shielding measures, but such pulses cannot be prevented in every instance.

Furthermore, acceleration sensors are known in the art in a plurality of technical applications. Such acceleration sensors are utilized, inter alia, in the control of kinetic processes, or also as trigger elements for initiating certain processes upon the occurrence of accelerations higher than a predetermined threshold value. In the conventional acceleration sensors, an electrical switch is closed and/or opened (mechanical "spring acceleration sensor"), when a defined acceleration has been reached and/or exceeded, or alternatively, by the prevailing acceleration, an electrical signal is directly generated (acceleration sensor with piezocrystal). One disadvantage herein resides in that the sensor system is connected via electrical connecting lines herein to the total system into which the acceleration sensor is incorporated. Thereby, electromagnetic interference pulses can be coupled in, for example, which can lead to failures and, in the most adverse case, to an erroneous triggering.

SUMMARY OF THE INVENTION

The invention is based on the object of providing a passive safety system as well as a method for triggering a passive safety system conceived in such a way that functional failures and erroneous triggering of the actual occupant restraint system due to external interference signals are precluded; in this connection, especially an optomechanical acceleration sensor is to be employed which is insensitive to electromagnetic disturbances.

In order to attain this object, the invention proposes a passive safety system of the type heretofore described wherein the output signal of the sensor unit and/or the trigger signal for the triggering unit is in each case an optical light signal, and wherein the sensor unit, the evaluating unit and/or the triggering unit are connected by means of lightguides or optical fibers.

The method furthermore proposed in accordance with this invention for the triggering of the passive safety system is characterized in that, for the activation of an occupant safety device such as an airbag system, an optical light signal is produced as the trigger signal and is passed on to a triggering unit or arrangement by way of an optical lightguide.

According to the invention, the signal exchange among the individual units takes place exclusively by optical light signals and by optical process, i.e. exclusively by lightguides. According to the triggering method of this invention, an optical trigger signal transmitted via an optical lightguide is utilized (at least) for triggering the occupant safety device. Otherwise, operation takes place by means of electrical signals, especially the functional monitoring and diagnostics of the safety device. Advantageously, optical light signals are, however, also employed if the communication of the individual components of the passive safety device is involved, without the occupant safety device being triggered.

On account of the connection of the individual components of the passive safety device according to this invention exclusively by lightguides, a reliable protection is obtained against the coupling in of electromagnetic interference pulses as well as other interference signals from the outside. The individual components (sensor unit, evaluating unit and triggering unit) wherein, besides the optical signals, also electrical signals are processed and generated ca be shielded against electromagnetic interference signals in a relatively simple way by inclusion in housings made of electrically conductive material According to an advantageous further development of the invention the provision is made that the sensor unit is equipped with an optical unit for the production of an optical output signal corresponding to the detected acceleration or deceleration. This optical unit preferably involves a light signal generating unit modifying the intensity of the light signal in dependence on the detected acceleration or deceleration. The intensity of the light signal can be varied in a relatively simple way in dependence on the acceleration. Furthermore, determination of the acceleration value can be realized rather simply by electro-optic or electronic ways, respectively, with the aid of the light intensity of the optical signal and comparison of the light intensity with a given threshold value for triggering the actual occupant protection device. The safety device according to this invention as per this further development is thus controlled by the light intensity.

Advantageously, an optical unit of the sensor unit is an optical filter element the transmission properties of which can be varied in dependence on the acceleration. The optical filter element comprises, for this purpose, regionally differing transmission properties and is arranged between a light-transmitting means and a light-receiving means, preferably between the ends of two lightguides, and is movable between the lightguides in such a way that it can be displaced relatively to the optical axis in dependence on the extent of acceleration or deceleration. The transmission properties of the optical filter element vary in dependence on the position of the optical filter element relatively to the light-transmitting and the light-receiving device or relatively to the two lightguides. The position occupied by the optical filter element depends, in turn, on the acceleration or deceleration of the vehicle. Consequently, a technically rather simple realization of an optical unit is provided, producing a light signal with a light intensity by means of which the acceleration or deceleration can be determined.

Advantageously, the optical filter element is constituted by a light-permeable disk, plate, or the like, with regionally differing light transmissions as seen over the area of the disk. These transmission properties vary preferably continuously or in stepwise fashion.

The sensor unit, in case the optical unit is designed as an optical filter element, exhibits preferably a spring-mass system with a spring element and with an inertial mass member coupled to the latter. The inertial mass member is freely movable and is deflected upon acceleration or deceleration of the vehicle. The optical filter element is coupled to the inertial mass member, especially being directly connected thereto. The optical filter element preferably takes over itself the function of the inertial mass member of the sensor device. The coupling and/or incorporation of the optical filter element with and/or into a spring-mass system for determining the acceleration or deceleration of the vehicle represents a structurally rather simple solution to the problem of moving the optical filter element in dependence on the instantaneous acceleration or deceleration relatively to the light-transmitting device and the light-receiving device (e.g., the two lightguides).

Advantageously, the optical filter element is provided with transmission properties which differ regionally as seen in the transverse direction to the optical axis and is movable transversely to the optical axis. Based on the regionally differing transmission properties, i.e. the regionally different light transmissions, the optical filter element, with constant intensity of the impinging light, varies the intensity of the exiting light in dependence on the acceleration or deceleration. As heretofore mentioned, the impinging light is preferably introduced via a first lightguide, and the emanating light is preferably removed via a second lightguide.

In an advantageous further development of the invention, the provision is made that the acceleration or deceleration is determined by means of the difference in intensity between the light signal fed to the optical filter element and the light signal exiting from the optical filter element. Thus, the determination of acceleration or deceleration is independent of the intensity of the light introduced into the optical filter element which, on account of diverse circumstances, may well be subject to light intensity fluctuations.

In an expedient further embodiment of the invention, the provision is also made that the light source producing and transmitting the light to be fed to the optical filter element is a part of the evaluating unit; in this arrangement, the light of this light source is transmitted via a first lightguide to the sensor unit and thus to the optical unit and/or the optical filter element. The light, varied in its intensity by the optical unit in dependence on the acceleration or deceleration is fed back as a optical signal to the evaluating unit via a second lightguide. Determination of the light intensity difference takes place in the evaluating unit preferably by comparison of two signals and by checking whether the light intensity difference is larger than/equal to a given threshold value, or smaller than a given threshold value. The two signals which are preferably electrical involve, on the one hand, a signal representing the intensity of the light from the light source and, on the other hand, a signal representing the intensity of the light signal coming from the optical unit. The arrangement of the light source in the evaluating unit has the advantage that no electrical energy whatever needs to be supplied to the sensor unit; rather, electrical signals, insofar as present, occur exclusively in the evaluating unit and accordingly electrical signal connections to other (optionally external) components of the safety device are not required.

Advantageously, the production of the optical trigger signal for triggering the actual occupant protection device takes place (also) in the evaluating unit. For this purpose, the evaluating unit is connected to the triggering device by way of a lightguide. In the triggering unit, the optical trigger signal is first converted into an electrical signal transmitted to a triggering arrangement for activation of the occupant safety device. Preferably, an optical (function-monitoring) signal is permanently transmitted via the same lightguide between the evaluating unit and the triggering unit; this signal is converted within the triggering unit into an electrical signal and, after reconversion into an optical signal, is fed back via a further lightguide to the evaluating unit. The optical function-monitoring signal fed to the triggering unit serves for monitoring the triggering unit and the entire safety device for an possible defects.

The triggering arrangement in the triggering unit is, for example, an electrical igniter for the ignition of a gas generator to inflate the airbag with combustion gases. The electrical signal converted in a converter, e.g. a light-emitting or laser diode, into the optical signal to be returned to the evaluating unit is also transmitted to the electrical triggering arrangement connected in series with the converter. This electrical signal is selected, for example with respect to its time curve and/or its size or energy, in such a way that the triggering arrangement will not respond. If an optical signal with a predetermined signature (magnitude, time curve) is returned to the evaluating unit, the entire safety system can be monitored. Thus, it is possible, for example, with the aid of the light intensity of the optical signal, to determine the type of error involved. If a short circuit has occurred, the electrical current flowing also through the triggering arrangement is larger (but still smaller than needed for activation of the triggering arrangement) so that also the light intensity of the optical signal produced in the triggering unit is increased which can be exploited, in turn, for the determination of a defect, in this case a short circuit. If no signal is returned, an interruption is determined in the electrical circuitry.

Advantageously, the optical signal produced by the evaluating unit and transmitted to the triggering unit also passes through the optical filter element. For this purpose, a further lightguide is provided in an advantageous further development of the invention between the evaluating unit and the sensor unit. The light transmitted via this lightguide to the optical filter element is fed, after the optical filter element, to an additional lightguide and transmitted via the latter to the triggering unit. The subsequent conversion into an electrical signal and the subsequent conversion of the electrical signal into an optical signal fed back to the evaluating unit make it possible t determine the measured acceleration or deceleration value in the evaluating unit by means of two separately received light signals whereby the functional reliability of the safety system according to this invention is enhanced.

As mentioned above, the light intensity of the optical monitoring signal fed to the triggering unit is chosen so that the electrical signal resulting from this optical light signal will not activate the triggering arrangement. As soon as a determination has been made in the evaluating unit that the acceleration or deceleration has reached, or has surpassed, a predetermined threshold value, the evaluating unit transmits the optical trigger signal, the light intensity of which is substantially higher than that of the optical monitoring signal. Based on this increased light intensity, the triggering unit—after conversion of the optical trigger signal into an electrical (trigger) signal—is traversed by an electrical current of adequate power for triggering the triggering arrangement. The trigger signal is advantageously generated by a corresponding activation of the light source of the evaluating unit.

In an advantageous further development of the invention, the provision is also made that the triggering unit is equipped with an energy storage means, the stored energy of which is fed to the triggering arrangement in the case when the triggering unit receives the optical trigger signal. The electrical connection between the triggering arrangement and the energy storage means can preferably be effected by way of a controllable switch fed with a control signal once the optical signal transmitted to the triggering unit has reached, or has surpassed, a predetermined light intensity.

In order to transfer the stored energy, the energy storage means is connected to the triggering arrangement while this storage means, according to an advantageous further development of the invention, is supplied for purposes of energy storage with the electrical signal produced by conversion of the optical monitoring signal fed to the triggering unit. This electrical (monitoring) signal in this embodiment of the invention is thus utilized for functional monitoring as well as for supplying the energy storage means with electrical energy. The circuitry of the energy storage means for storing the energy and for the delivery of the thus-stored energy preferably includes an electronic change-over switch operated in dependence on the size of the electrical signal in order to connect the energy storage means to the input of the triggering unit upon the presence of the optical monitoring signal (normal operation of the safety device where the optical trigger signal is not present) and in order to establish connection to the triggering arrangement upon the presence of the optical trigger signal.

The method of triggering the passive safety device is a follows:

the acceleration or deceleration is determined by the sensor unit transmitting an output signal corresponding to the measured value, and a trigger signal for activation of a occupant safety device for the occupants is applied to the triggering unit arranged separately from the sensor unit arranged separately from the sensor unit in case the acceleration or deceleration corresponding to the output signal of the sensor unit reaches/exceeds or falls below a predetermined threshold value, and for activating the occupant protection device, an optical light signal is produced as a trigger signal, this signal being fed to the triggering unit by way of an optical light-guide.

Finally, the invention provides an acceleration sensor to which are connected an optical input lightguide and an optical output lightguide and which comprises a light transmission device for transmitting the impinging light fed from the input lightguide to the output lightguide. The light transmission device is fashioned as a spring-mass system (spring acceleration sensor). Upon the occurrence of accelerations, the light transmission device is movable, the light transmission characteristics of this device changing in dependence on its movement and/or its extent of movement in such a way that the light fed into the output lightguide is a measure for the acting acceleration. Owing to the construction as a swingable, preferably damped spring-mass system, the light transmission device is returned into its starting position when the acceleration is not (any more) active and is subsequently maintained in this starting position until accelerations reoccur.

The acceleration sensor according to this invention has an inertial mass which is deflected or moved in some other way upon accelerations. The movement of the mass, which is a measure for the prevailing acceleration, is converted into an optical signal with the acceleration sensor of this invention; this signal is transmitted out via the output lightguide. This optical output signal is generated by influencing the light transmitted to the acceleration sensor via the input lightguide. The influencing step can involve a change in the intensity and/or the frequency/wavelength of the light from the input lightguide. In case light pulses are fed to the acceleration sensor, the influencing of this light signal for the optical display of the effective acceleration can also be utilized with regard to the pulse/interval ratio. The decisive aspect in the optomechanical acceleration sensor according to this invention is the fact that an optical signal or, expressed more generally, electromagnetic radiation is transmitted as the output signal. This signal or this radiation has been generated without the use of electrical signals; in order to generate this signal or this electromagnetic radiation, the acceleration sensor of this invention is supplied with light or electromagnetic radiation fed thereto via the input lightguide. Consequently, the acceleration sensor according to the invention is safe from interference, especially interference-proof with respect to electromagnetic interference pulses.

The term "light" is used within the scope of this invention so as not to denote exclusively visible electromagnetic radiation; rather, the acceleration sensor according to this invention operates also with electromagnetic radiation transportable, as is light, through optical fibers and/or optical fiber bundles the frequency and/or wavelength of which lie outside of the range for (visible) light. Furthermore, it is to be pointed out that the word "acceleration" means positive accelerations as well as negative accelerations, i.e. decelerations. The term "lightguide" is understood to mean within the scope of this invention a conductor for light and/or electromagnetic radiation consisting of a single optical fiber or a bundle of such fibers.

As set out above, the acceleration sensor of this invention involves a "spring acceleration sensor" exhibiting a preferably damped vibration system (spring-mass system). For realizing this vibration system, it is possible either to design the light transmission device proper to be spring-elastic or to arrange the light transmission device in a spring-elastic fashion. Also a combination of both features is possible. While, in case of a spring-elastic light transmission device, the shape of the latter changes when acceleration forces are effective, it is its position between the two lightguides which changes in case of a light transmission device that is mounted in a spring-elastic fashion or suspended in spring-elastic fashion.

In an advantageous further development of the invention, the light transmission device exhibits an optical element which is spring-elastic and/or which is mounted in spring-elastic fashion; this element is guided to be movable in the direction of the spring force as well as in opposition to the latter, the optical element being located between the ends of the two lightguides and/or being movable into and out of the interspace between the ends of the two lightguides. The mode of operation of the acceleration sensor depends on the design and the physical properties of the optical element: In the simplest case, the optical element is light-impermeable and blocks light transmission in dependence on the applied acceleration. In this acceleration sensor, either light is thus transmitted via the output lightguide, or alternatively n light from the input lightguide will enter the output lightguide. In dependence on the design of the acceleration sensor, one of these two conditions is a sign for the fact that a predetermined minimum acceleration has been detected.

In case the optical element, as seen in its direction of movement, exhibits regionally differing transmission properties, preferably a degree of transmission which rises in total or drops in total, as is suggested according to an advantageous further development of the invention, then a light signal is produced at the output of the acceleration sensor, the intensity of which is a yardstick for the instantaneously prevailing acceleration. A quantitative measurement of the acceleration is possible by means of such an acceleration sensor. The optical element can also be designed as an optical neutral wedge, as an opaque, preferably plate-shaped element with one or several holes, slots, gaps, in each case preferably in a wedge shape, or as an optical step filter. Depending on the field of usage of the acceleration sensor, one of these optical elements can be utilized, making it possible to carry out either quantitative or qualitative acceleration measurements and/or detections.

When using a step filter as the optical element, this filter is preferably designed as a glass plate, one half of which is a, for example, 50% transmission filter, and the other half of which consists of a material having essentially a damping factor close to 0, i.e. a transmission factor of close to 1.

An advantageous further development of the invention is characterized in that the light transmission device is fashioned as a light-bending unit, the light from the first lightguide impinging thereon. This light-bending unit is movable in dependence on the acceleration; upon the effect of an acceleration, the amount of which is larger than a predetermined threshold value, this light-bending unit, in one movement position, deflects the light emanating from the first lightguide to the second lightguide. The acceleration sensor of this invention with light-bending unit thus will transmit a light output signal via its output lightguide only if the instantaneously effective acceleration is higher than or equal to a specific threshold value. The provision can be made that the light-bending unit can be deflected and/or moved to maximally into the movement position wherein it deflects the light of the first lightguide to the end of the second lightguide. If such a limitation of movement is not provided for, then light will be fed into the output lightguide only for a short time, namely when the deflected light beam passes over the end of the output lightguide. This briefly applied light signal will then be evaluated correspondingly in the evaluating unit to which the acceleration sensor is connected via its output light-guide.

A rotatable reflecting mirror or a rotatable Brewster's window or element can be utilized as the light-bending unit. The Brewster element involves a light-transmitting optical element which totally reflects, in dependence on its rotary position (total reflection angle between light impingement and light incidence surface of the optical element), the incident light of the input lightguide and transmits same to the output lightguide. However, it is likewise possible just as well to feed the proportion of light penetrating through the Brewster element into the output lightguide to thus make a qualitative statement on the detected acceleration (larger than, equal to or smaller than a given threshold value). The rotating movement for the rotatable optical element can be generated directly by the acceleration forces, for example by providing that the axis of rotation does not pass through the mass center of the optical element. It is also possible to convert a translatory motion of a part exposed to the acceleration into a rotational movement of the optical element.

A restoring force acts on the light-bending unit, preferably the force of a restoring spring for turning the light-bending unit back into the starting position when the acceleration is no longer active, ind for retaining the light-bending unit in the starting position.

Another version of the acceleration sensor according to this invention is directed to the feature that the light transmission device is fashioned is a lens system displaceable longitudinally along an optical axis between the ends of the two lightguides. Advantageously, a restoring force acts on the lens system and/or on a mounting element holding the lens system, this force returning the lens system into the initial position when the acceleration is not (any more) effective, and retaining the system in the initial position. By shifting the lens system in dependence on the applied acceleration, the focus of the lens system is likewise shifted. If the lens system is displaced in such a way that the focus lies in the plane of the end face of the end of the output lightguide, then light is fed into the output lightguide. Thus, the acceleration sensor will issue an output signal only in case the measured acceleration is higher than or equal to a predetermined threshold value. Also this embodiment of the acceleration sensor can include a movement or displacement restriction for the lens system or its mounting element so that the light output signal will be applied continuously starting with a specific acceleration.

Advantageously, the end of the input lightguide is attached to a movable holding element movable toward and/or away from the end of the output lightguide, namely in dependence on the instantaneously effective acceleration. By way of a restoring spring, the holding element is returned into the initial position when the acceleration is not (any more) effective, and retained in this position. With a holding element movable along the optical axis between the ends of the two lightguides, more or less light from the input lightguide will enter, in dependence upon the mutual spacing of the two lightguides, into the output lightguide. Therefore, with the aid of the light intensity of the light signal in the output lightguide, a conclusion can be drawn regarding the instantaneously effective acceleration. If the holding element is moved in parallel to the end face of the output lightguide, intersecting during its motion the optical axis emanating from the end of the output lightguide, then light will be fed, starting with a certain minimum acceleration, from the input lightguide into the output lightguide; this is the case if both lightguides are located in mutual opposition. In this case, an ON/OFF acceleration sensor exists which yields an output signal once the acceleration has exceeded a predetermined threshold value or is equal to this threshold value.

Advantageously, a mechanical spring device and/or a pneumatic spring device (gas-pressure spring unit) is provided for generating the restoring force.

With the use of a pneumatic spring unit, the acceleration sensor exhibits advantageously a unilaterally sealed hollow cylinder wherein a piston is supported in gastight fashion and being displaceable in the axial direction of the hollow cylinder. The space between the piston and the sealed end face of the hollow cylinder is filled with a gas. The light transmission unit is coupled with the piston and is moved or otherwise affected by this piston when acceleration forces act on the acceleration sensor, on account of the expansion and compression of the sealed gas volume, a restoring force is produced effective via the piston on the light transmission unit.

The light transmission device advantageously exhibits, in case of a pneumatic acceleration sensor, a hollow cylinder having a light-transmitting mantle and arranged between the ends of the two lightguides. An optical element is located in the interior of the hollow cylinder and is in contact in gastight fashion with the inner surface of the hollow cylinder either directly or indirectly by way of a mounting element. The optical element is slidingly displaceable in the hollow cylinder along the longitudinal axis of the latter. The space between the optical element and the sealed end face of the hollow cylinder is filled with a gas. In this way, a compact optical and pneumatically spring-supported light transmission device is created for an optomechanical acceleration sensor which device is rugged and stable.

In order to improve the light transmission properties and the degree of efficiency of coupling light into the output lightguide, respectively one imaging optic is arranged, in accordance with another advantageous embodiment of the invention, at the ends of the two lightguides; this optical unit is preferably designed as a lens system. In particular, the lenses of this lens system are produced by an appropriate shaping of the end surfaces of the ends of the two ligghtguides. If the lenses are formed on the end surfaces of the two lightguides, then such a lens can be provided per fiber end face.

The acceleration sensor according to this invention can be designed so that the light transmission device retains its condition for transmitting light from the input lightguide to the output lightguide in case of accelerations larger than or equal to a predetermined threshold value, i.e. an optical element of the acceleration sensor is arrested in a specific position as soon as it has reached this position. In case of acceleration sensors transmitting a light signal solely starting with a specific minimum acceleration from their output, the arresting of the optical element and/or of the light transmission device has the advantage that the light from the input lightguide is continuously fed into the output lightguide. The light conducted by the output lightguide can then be utilized for the triggering of processes which are initiated and controlled in dependence on energy. This procedure may not be of utility in passive restraints for automotive vehicles wherein an instant triggering of the safety unit is involved; nevertheless, there could be areas of usage where the objective resides in transmitting energy in the form of light via the output lightguide at specific accelerations in order to control additional processes.

BRIEF DESCRIPTION OF DRAWINGS

Embodiments of the invention will be described in greater detail hereafter with reference to the accompanying drawings wherein:

FIG. 6 shows a fourth embodiment of the acceleration sensor in a top plane view;

FIG. 7 shows a section taken along line VII—VII of FIG. 6;

DETAILED DESCRIPTION OF THE INVENTION

Figure 1:
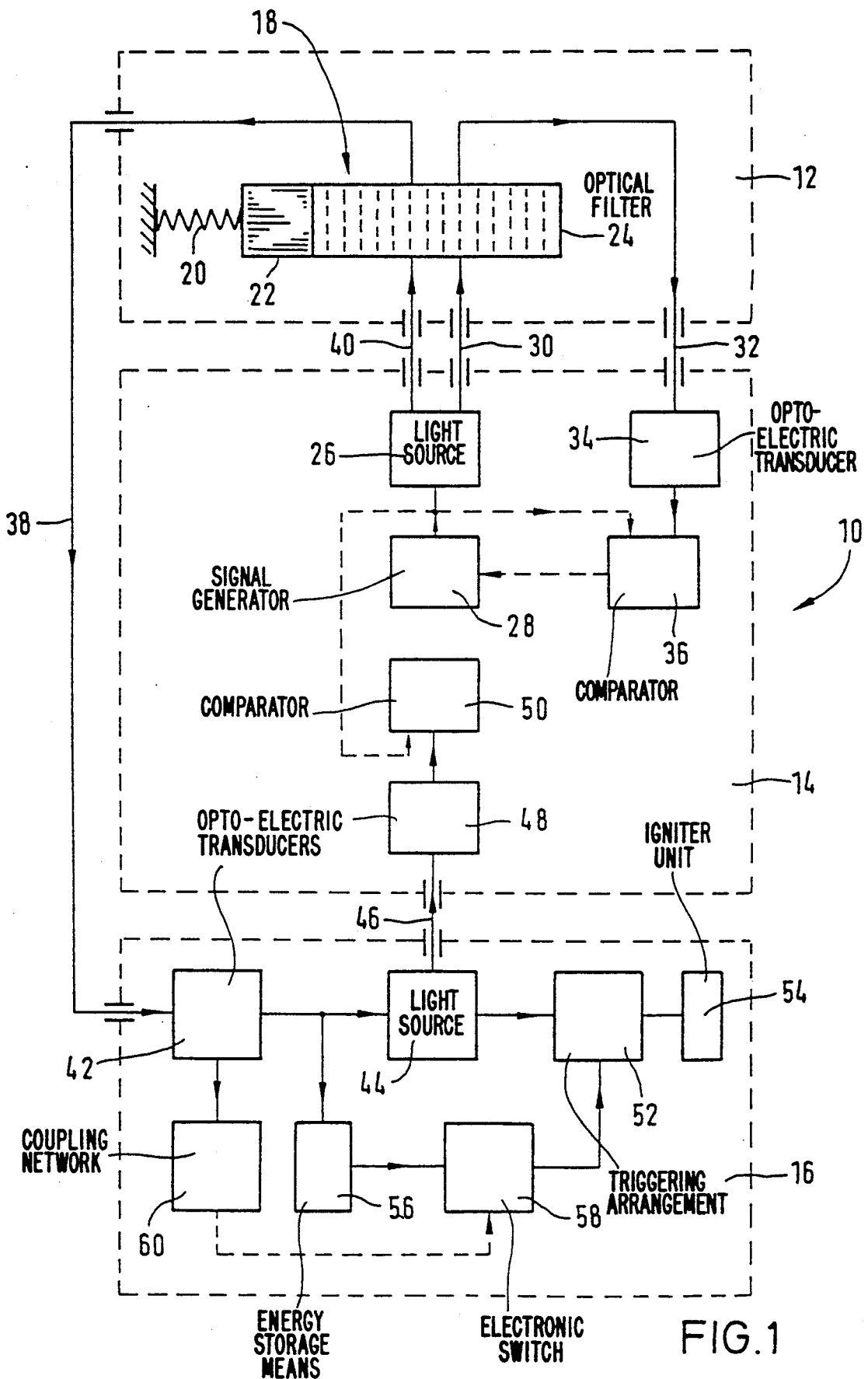
FIG. 1 is a block circuit diagram of the electronic triggering circuit of the passive safety device with an optomechanical acceleration sensor in accordance with a first embodiment of the invention.

FIG. 1 illustrates schematically a passive safety device 10 of a vehicle, the circuitry of which is shown with the electronic triggering unit in the form of a block circuit diagram. The passive safety device 10 is divided into three functional systems of sensor device 12, an evaluating unit 14, and a triggering unit 16. The sensor unit 12 exhibits an optomechanical sensor 18 according to a first embodiment, by way of which the accelerations and decelerations of the lo vehicle are detected. The sensor 18 varies the intensity of an optical light signal in dependence on the magnitude of acceleration or deceleration of the vehicle. The optical light output signal of the sensor 18 is fed to the evaluating unit 14 arranged separately from the sensor unit 12 In the evaluating unit 14, the received optical signal is evaluated and a check is made whether the measured acceleration (deceleration) reaches or exceeds a predetermined threshold value. In dependence on the result of this comparison, the evaluating unit 14 generates an optical trigger signal which is fed to the triggering unit 16. Upon the reception of this trigger signal, an occupant protection device is activated in the triggering unit 16; for example, a gas bag is filled with gas.

As indicated in FIG. 1, the acceleration sensor 18 comprises a spring-mass system, the spring 20 of which rests at one end on a fixed point and is connected at its other end with an inertial mass member 22. An optical filter element 24 is connected with the inertial mass member 22. In case of accelerations or decelerations acting on the vehicle, the inertial mass member 22 and the optical filter element 24 are deflected from their rest position by an extent corresponding to the amount of accelerative or decelerative force, the direction of the deflection depending on the direction of the acting force (acceleration or deceleration).

In conjunction with the evaluating unit 14, the measured acceleration or, respectively, deceleration is determined by means of the sensor unit 12 in the manner described below. The evaluating unit 14 is provided with a light source 26 comprising, for example, a light-emitting or laser diode or a light-emitting diode array. The light source 26 is fed with the output signal of a signal generator 28 which latter applies, for example, an electrical pulse signal having a defined pulse sequence, or an amplitude-modulated carrier signal, to the light source 26. The light from the light source 26 is coupled into a first lightguide or optical fiber 30 and supplied, from the evaluating unit 14, to the sensor unit 12. The light leaving the first lightguide 30 penetrates the optical filter element 24 and is fed at the output of the element 24 into a second lightguide or optical fiber 32, by way of which it is fed back to the evaluating device 14. The two optical fibers 30, 32 are arranged in such a way that their mutually opposed ends are in alignment with each other, the optical filter element 24, movable transversely to the optical axis, being arranged between the two ends of the lightguides. The optical filter element 24 exhibits a transmission characteristic which is regionally different for a specific wavelength spectrum. Accordingly, the light leaving the first lightguide 30 is attenuated depending on the position of the optical filter 24; therefore, the intensity of the light passed through the second lightguide 32 is different from that of the light of the first lightguide 30, i.e. larger or smaller. Since the position of the optical filter element 24 relatively to the two lightguides 30, 32 is dependent on the prevailing acceleration or deceleration, a conclusion can be drawn regarding the instantaneous acceleration or deceleration from the intensity of the light signal of the second lightguide 32. The light exiting from the second lightguide 32 is converted in the evaluating unit 14, in an opto-electric transducer 34 which can be, for example, a solar cell arrangement, into an electrical signal representing the light intensity of the light signal from the second lightguide 32. The electrical output signal of the opto-electric transducer 34 is fed to a comparator 36 of the evaluating unit 14 wherein it is compared with an electrical signal representing the intensity of the light from the light source, for example, the activating signal of the light source 26. In the electronic comparator 36, the relationship of the light intensities of the light signals carried by the two lightguides 30, 32 is evaluated; this relationship is a measure for the instantaneously prevailing acceleration or deceleration experienced by the spring-mass system, i.e. the sensor 18. The comparator 36 yields a corresponding output signal, the further processing of which will be further described hereinafter.

By way of-two further lightguides or optical fibers, namely the third lightguide 38 and the fourth lightguide 40, the evaluating unit 14 is connected to the triggering unit 16; the evaluating unit 14 feeds differing optical signals to the triggering unit 16 by way of this optical signal connection. The connection of the evaluating unit 14 and the triggering unit 16 via the lightguides 38 and 40 is not effected directly; rather, the evaluating unit 14 is connected to the sensor unit 12 by way of the fourth lightguide 40 connected in parallel to the first lightguide 30. The fourth lightguide 40 conducts the light of the light source 26 to the optical filter element 24, just as the first lightguide 30. The end of the third lightguide 38 is arranged in opposition to the end of the fourth lightguide 40 and in alignment with the latter; the light leaving the fourth lightguide 40 is coupled into the third lightguide after transmission through the optical filter element 24 Based o the locally differing transmission characteristics (light transmission) of the optical filter element 24, the intensity of the light signal transmitted to the third lightguide 38 depends on the extent of the instantaneously acting acceleration or deceleration. The third lightguide 38 is extended from the sensor unit 12 and into the triggering unit 16. In the triggering unit 16, an opto-electric transducer 42 is arranged which is designed, for example, as a solar cell arrangement. The opto-electric transducer 42 converts the optical light signal of the third lightguide 38 into an electrical signal, the magnitude of which is a measure for the light intensity of the optical signal and thus a measure for the presently prevailing acceleration or deceleration. The electrical output signal of the opto-electric transducer 42 is fed to a controllable light source 44 which can be, as in case of the light source 26, a light-emitting or laser diode or light-emitting diode a array. The light produced by the light source 44, the light intensity of which is dependent on the size or magnitude of the electric output signal of the opto-electric transducer 42 and thus on the intensity of the light signal from the third lightguide, is fed back, via a further, fifth lightguide 46, from the triggering device 16 to the evaluating unit 1 where it is converted into an electrical signal in an opto-electric transducer 48. The electrical output signal of the opto-electric transducer 48 is fed to an electronic comparator 50 wherein the relationship of the light intensities of the returned light signal of the fifth lightguide and those of the light signal of the fourth lightguide 40 is made into a proportion, and the proportion is evaluated. The output signal of the electronic comparator 50 thus represents, like the output signal of the electronic comparator 36, the instantaneous acceleration or deceleration In this way, the acceleration or deceleration is determined in the evaluating unit 14 with the aid of several optical signals, increasing the functional safety of the safety device 10.

A triggering arrangement 52 is connected in series wit the light source 44 of the triggering unit 16; this triggering arrangement can be, for example, an electrical igniter unit for a gas generator indicated by reference numeral 54, the gas generator producing the gas for the inflation of an airbag (not shown in FIG. 1). In addition to the light source 44, an energy storage means 56, for example in the form of a capacitor, is also connected to the output of the opto-electrical transducer 42 of the triggering unit 16. In the embodiment illustrated in FIG. 1, the energy storage means 56 is supplied with energy via the output of the opto-electrical transducer 42. The output of the energy storage means 56 is connected to one of the poles of a controllable electronic switch 58, the other pole of which is connected to the triggering arrangement 52. Furthermore, the opto-electric transducer 42 has a further output connected to a coupling network 60 by way of which an electrical signal is coupled out of the opto-electrical transducer 42. The thus-coupled out signal is applied to a control electrode of the electronic switch 58 whereupon the electronic switch 58 is activated.

The mode of operation of the triggering unit 16 will be further described hereinafter. Via the third lightguide 38, the triggering device 16 receives an optical light signal, the light intensity of which depends on the instantaneous acceleration or deceleration. The optical signal of the third lightguide 38 fed to the opto-electrical transducer 42 is converted into an electrical signal which is fed to the light source 44 and to the triggering arrangement 52 connected electrically in series with this light source. The maximum intensity of the optical signal transmitted via the third lightguide 38 in case of accelerations and decelerations whereby the triggering arrangement 52 is not as yet to be triggered, is selected so that the electrical signal converted in the opto-electrical transducer 42 cannot bring about a triggering of the triggering arrangement 52. The energy applied to the triggering arrangement 52 with this electrical signal is too low. However, on the other hand, the energy of this electrical signal is sufficient for activating the light source 44 so that the latter will transmit light. The light of the light source 44 passes via the fifth lightguide 46 into the evaluating unit 14. With the aid of the optical light signal carried by the fifth lightguide 46, two aspects can be perceived. On the one hand, the presence of an optical light signal at the fifth lightguide 46 indicates in accordance with its character that the electrical connections to the triggering arrangement 52 do not exhibit any defect (short circuit or wire breakage), for otherwise there could not be the production of an electrical signal, or, expressed differently, there could not be any electrical current flow. On the other hand, a check can be made with the aid of the intensity of the optical light signal carried by the fifth lightguide 46 whether there is a short circuit in the circuitry of the triggering arrangement 52. In case of a short circuit, the current flowing through the light source 44 would be stronger than in the normal case, which could be recognized from the increased light intensity of the signal of the fifth lightguide 46. During normal operation, i.e. when operating the safety device without triggering the triggering arrangement 52, the light signal of the fifth lightguide 46 thus serves for determining the acceleration or deceleration, as well as for monitoring the functional readiness of the entire safety system 10, especially the triggering arrangement 52. By corresponding displays, activated in case of a defect (short circuit or wire breakage), the defect of the safety device 10 can be indicated.

As soon as a determination has been made in the evaluating unit 14 with the aid of the output signals of the two electronic comparators 33 and 50 that the instantaneous acceleration or deceleration is equal to or larger than a predetermined threshold value, at which the occupant protection device of the safety device 10 is to be activated, the evaluating unit 14 generates the optical trigger signal. This is done by the feature that the signal generator 28 transmits to the light source 26 an electrical (trigger) signal at which the light source 26 transmits a light pulse of an intensity higher than during normal operation. This light pulse of high intensity results, after the filter element 24, in an optical light signal of increased light intensity applied to the third lightguide 38. Upon receiving this trigger signal of increased light intensity, an electrical signal is coupled out of the opto-electrical transducer 42 of the triggering unit 16 by way of the coupling network 60, the electronic switch 58 being closed by this signal. At this point, the triggering arrangement 52 is connected in parallel to the output of the energy storage means 56 which delivers its stored energy to the triggering arrangement 52. This stored energy is sufficiently high for triggering the triggering unit 52 and activating the occupant safety device.

One of the essential features of the electronic trigger circuit of the passive restraint device or system 10 of FIG. 1 is that the three functional blocks or components of the safety device, namely the sensor unit 12, the evaluating unit 14 and the triggering unit 16 are connected with one another exclusively via the lightguides 30, 32, 38, 40, 46, and thus communication among the three components takes place exclusively via optical light signals. Consequently, there is no longer a susceptibility to disturbances of the safety device 10 due to coupled-in external electromagnetic interference signals. The arrangement and distribution of the individual components of the and to the sensor unit 12, evaluating unit 14 and triggering unit 16 are chosen so that solely the evaluating unit 14 needs to be supplied externally with electrical energy, namely for the light source 26. The supply lines for the light source 26 and, respectively, the signal generator 28 are the only electrical connecting cables Leading to the safety device 10. Electromagnetic interference signals coupled in via these connecting lines have no effects whatever on the mode of operation of the safety device 10. Another feature of the safety device 10 described herein resides in that, for increasing the functional safety, the acceleration or deceleration is determined twice with the aid of several optical light signals. Depending on the design of the system it is possible to activate the triggering device 52 in case the attainment, or exceeding, of a predetermined acceleration is indicated by one output signal of the two comparators 36, 50, or in case both output signals of the comparators 36, 50 indicate such a status. Finally, an optical monitoring signal for monitoring the operability of the triggering unit 16 is transmitted to the triggering unit 16 besides the trigger signal for activation of the occupant protection device, during normal operation. For this purpose, only one further lightguide connection, namely the fifth lightguide 46, is required, but the fifth lightguide or optical fiber 46 is present anyway on account of the dual determination of the acceleration or deceleration.

Figure 2:
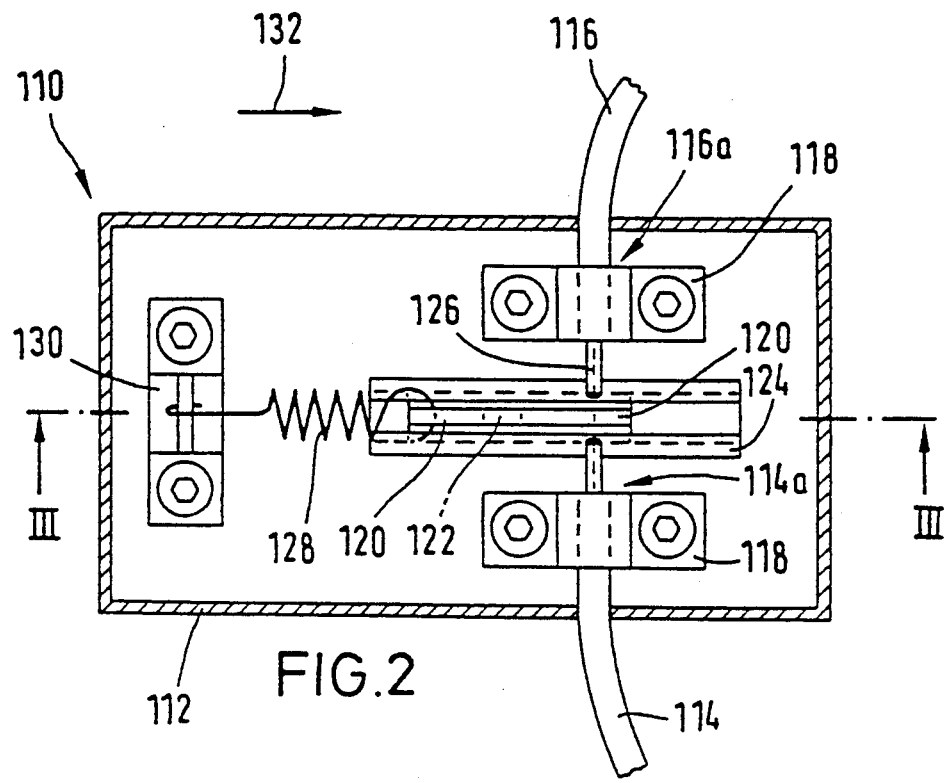
FIG. 2 is a top view, i.e. horizontal section, of an acceleration sensor according to a second embodiment of the invention.
Figure 3:
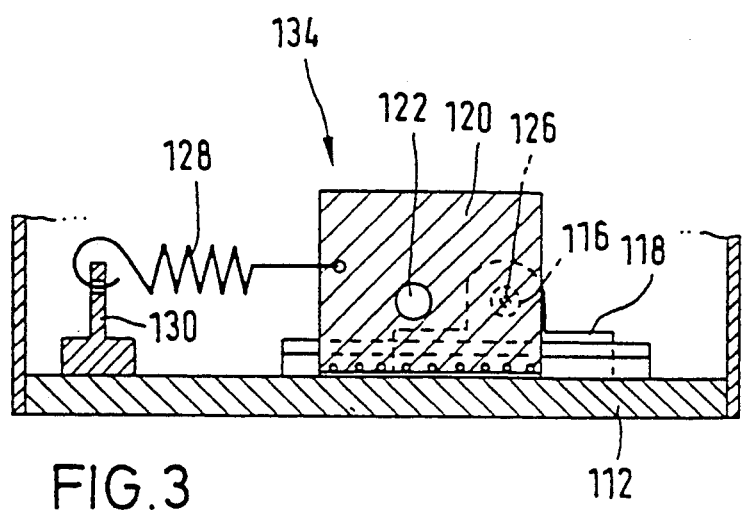
FIG. 3 is a section taken along line III—III of FIG. 2.

FIGS. 2 and 3, respectively, show schematically a top partially sectional view of and a vertical section through the "innards" (i.e. the interior) of an optomechanical acceleration sensor 110 according to a second embodiment. The acceleration sensor 110 has a housing 112 into which an input lightguide or optical fiver 114 is extended, an output lightguide or optical fiber 116 leading out of this housing. The ends 114a, 116a of both lightguides 114, 116 are fixed in the housing 112 by means of clamps 118 in such a way that the end faces of the lightguide ends 114a, 116a are arranged at a small distance from each other in mutual opposition. A perforated plate 120 with a through hole 122 is inserted in the interspace between the two ends 114a, 116a. The perforated plate 120 is guided to be displaceable on a guide rail 124, which rail is mounted on the floor of the housing 112. The guide rail 124 extends at a right angle to the optical axis 126 of the two lightguides 114, 116 so that the perforated plate 120 can be moved forward and backward transversely to the optical axis 126. One end of the helical spring 128 engages the perforated plate 120, the other end of the spring being attached to a mounting part or element 130.

The acceleration sensor 110 is arranged on the object (e.g. a vehicle), the acceleration of which is to be measured, in such a way that the perforated plate 120 is movable in the direction of (and oppositely to) the accelerations to be measured. A possible measuring direction is indicated in FIGS. 2 and 3 by the arrow 132.

Upon acceleration in the direction of arrow 132, the perforated plate 120 is deflected, thus being displaced along the guide rail 124. Depending on the direction in which the acceleration is effective, and on the magnitude of acceleration, the perforated plate 120 is shifted to such an extent that the through hole 122 enters the zone between the ends 114a, 116a of the two lightguides 114, 116 and comes into alignment with the lightguide ends 114a, 116a. In this position of the perforated plate 120, the light exiting from the end 114a of the input lightguide 114 impinges on the end 116a of the output lightguide 116 and is further transmitted via the latter so that the output lightguide 116 conducts a light signal. With an acceleration determined with respect to its direction and magnitude, the light from the input lightguide 114, which is otherwise shielded with respect to the output lightguide 116 by the perforated plate 120, passes at least briefly to the output lightguide end 116a, or even does so permanently if the deflection movement of the perforated plate 120 is limited by a stop arranged, for example, in the guide rail 124.

The perforated plate 120 represents, in the broadest sense, an optical transmission element 134 affecting the transmission of the light leaving the input lightguide 114 to the output lightguide 116 in dependence on the acceleration acting on the perforated plate 120.

Figure 4:
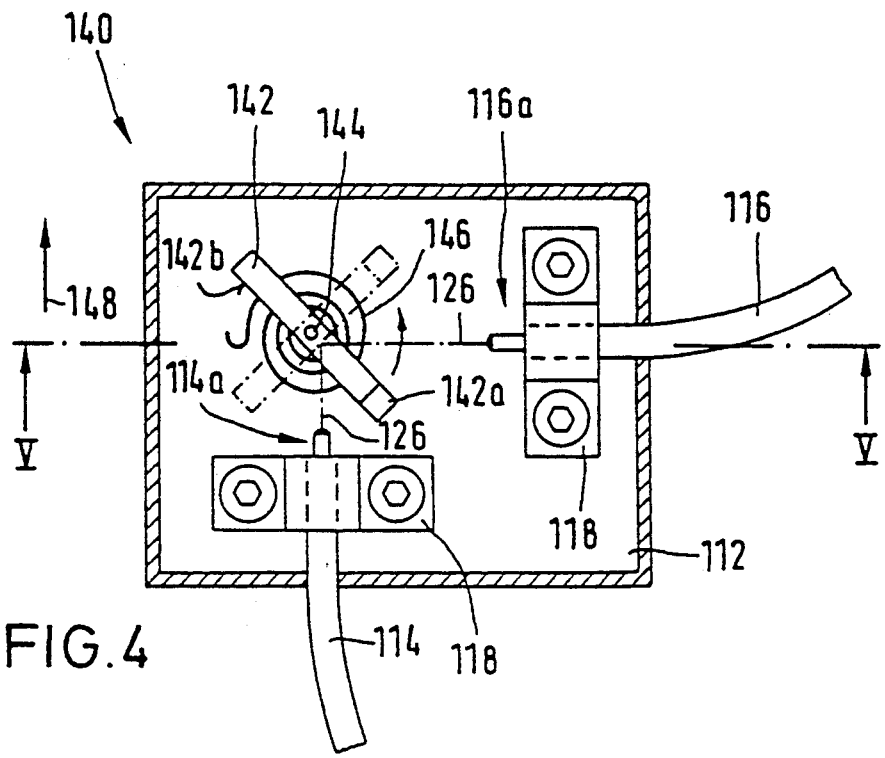
FIG. 4 is a top view of an acceleration sensor according to a third embodiment of the invention.
Figure 5:
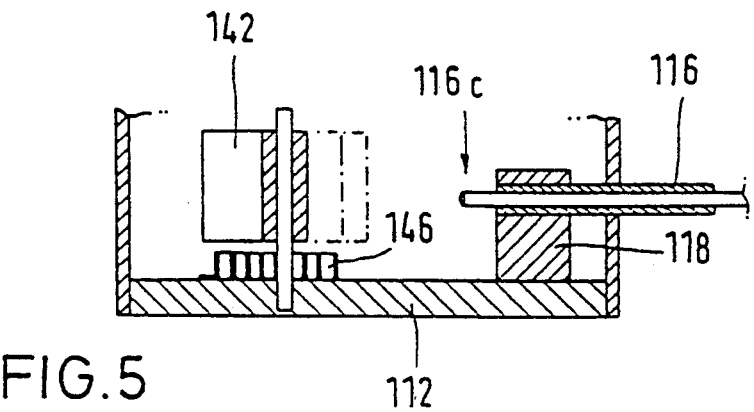
FIG. 5 is a section taken along line V—V of FIG. 4.

FIGS. 4 and 5 show a third embodiment of an acceleration senso 140. The parts of the acceleration sensor 140 corresponding to the parts of the acceleration sensor 110 according to FIGS. 2 and 3 are denoted by the same reference numerals. In the acceleration sensor 140, the ends 114a, 116a of the lightguides 114, 116 are fixed in the housing 112 to be rotated by 90° with respect to each other. The light leaving the input lightguide 114 impinges upon an optical element 142 rotatable about a vertical axis 144 perpendicularly projecting from the bottom or floor of the housing. The optical element 142 has a weighted rim 142a extending in parallel to the axis of rotation 144, the axis 144 extending outside of the mass center of gravity of the optical element 142. A spiral spring 146 is arranged between the optical element 142 and the housing 112, the inwardly positioned end of this spring being mounted with the optical element 142, and the outwardly positioned end of this spring being affixed to the housing.

FIG. 4 shows the initial position of the optical element 142 at zero acceleration. Due to the imbalance of the optical element 142 produced by the weighted end (rim 142a), this element is turned when the optical element 142 is exposed to acceleration forces in the direction of arrow 148, i.e. Ln a direction that is not in parallel to the plane of the extension of the optical element. Depending on the size of the acceleration in the direction of arrow 118, the optical element 142 is deflected to a greater or lesser extent. In case the acceleration is so high that the optical element 142 is turned by about 90° from the position shown in FIG. 4, the light leaving the end 114a of the input lightguide 114 in the direction of the optical axis 126 is reflected from the surface 142b of the optical element 142 to the end 116a of the output lightguide 116. For this purpose, the optical element 142 either has a reflecting surface 142b or consists of a material, the Brewster angle of which (angle of total reflection) is such that the light from the input lightguide 114 impinging on the surface 142b is, in an angular position of the optical element 142, totally reflected to the output lightguide 116.

A fourth embodiment of an acceleration sensor 150 is IO illustrated schematically in FIGS. 6 and 7 wherein the parts of the acceleration sensor 150 corresponding to the parts of the acceleration sensor 110 according to the second embodiment (FIGS. 2 and 3) are denoted by identical reference numerals.

The two lightguides 114, 116 are fixed in the housing 112 by the clamps 118 in such a way that their ends 114a, 116a are arranged at a comparatively large distance from each other in mutual opposition. The end faces 114b, 116b of the two lightguide ends 114a, 116a extend in parallel to each other, the optical axis 126 between the two lightguides 114, 116 intersecting both end faces 114b, 116b and standing perpendicularly thereon. A lens 152 is arranged in the zone between the two lightguide ends 114a, 116a; this lens is retained by a holding element 154. The lens 152 lies on the optical axis 126. The holding element 154 is displaceably guided on a twin guide rail 156a, 156b. Two helical springs 158 are located between one of the mounting clamps 118 and the holding element 154. Each helical spring 158 is arranged coaxially to one of the guide rails 156a, 156b surrounded by the respective spring. The helical springs 158 are connected, on the one hand, with the mounting clamp 118 and, on the other hand, with the holding element 154.

In FIGS. 6 and 7, the holding element 154 is shown in the position occupied at zero acceleration. As soon as an acceleration acts on the holding element 154 (and on the lens 152) in the direction of arrow 169 (for example as a consequence of a deceleration in a direction in opposition to arrow 169 in case of an automotive vehicle equipped with the acceleration sensor 150 involved in a rear-end collision), the holding element 154 including the lens 152 is shifted in the direction of arrow 169 against the force of the springs 158. As can be seen from FIG. 7, a displacement position exists wherein the two focal points 162 of the lens 152 lie in the end faces 114b, 116h of the two lightguide ends 114a, 116a. In this displacement position, almost the entire light of the input lightguide 114 is fed into the end 116a of the output lightguide 116. In all other displacement positions of the lens 152, substantially less light will pass to the output lightguide 116. Thus, judging from the intensity of the light from the output lightguide 116, a determination can be made whether the effective acceleration is higher than or equal to a predetermined threshold value. If the displacement path of the holding element is restricted by, for example, a stop at this exposed displacement position, the output lightguide 116 will continuously conduct the intense light if the acceleration is equal to or larger than the threshold value. The intense light of the output lightguide 116 can be utilized, as in case of the other acceleration sensors described herein, for example for triggering a passive airbag safety system of a automotive vehicle, i.e. for the ignition of the gas generator.

Figure 8:
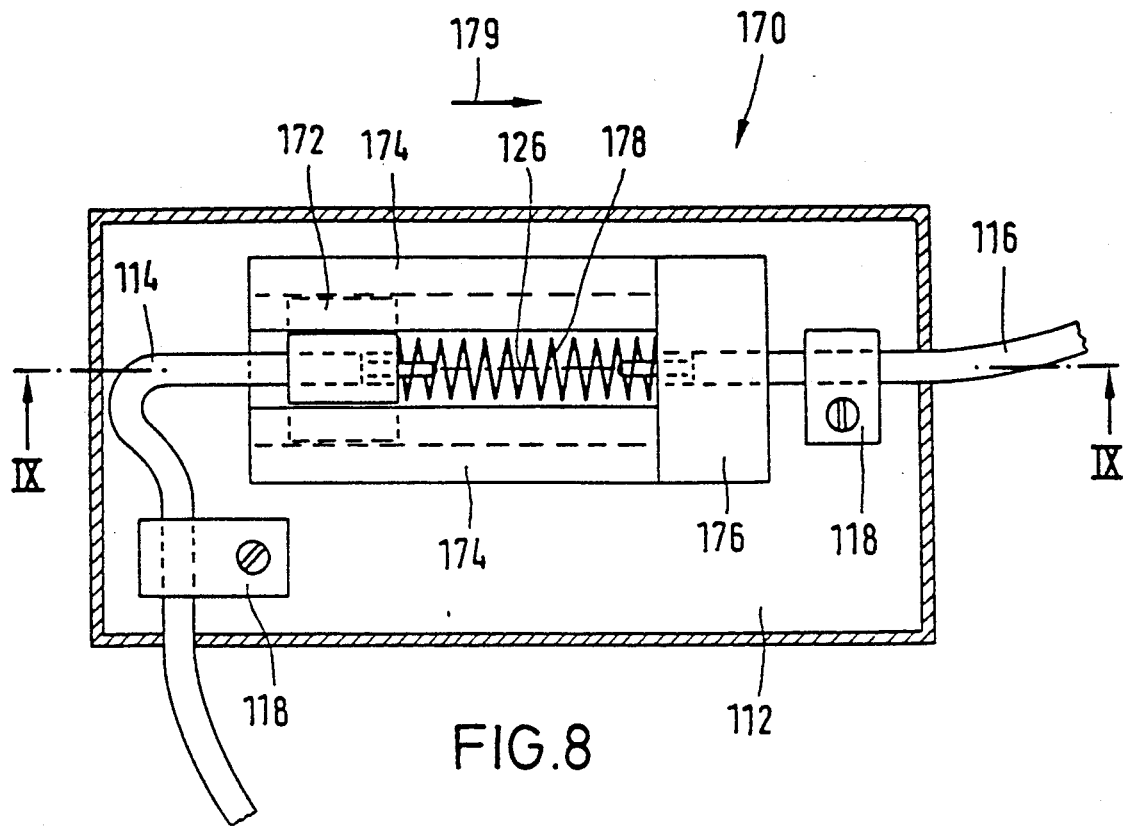
FIG. 8 shows, in top view, a fifth embodiment of the acceleration sensor according to this invention.
Figure 9:
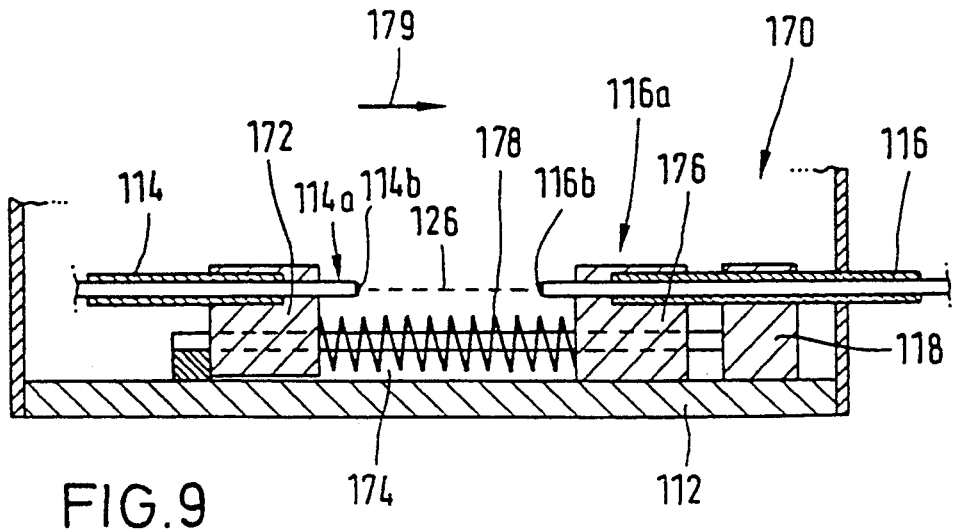
FIG. 9 is a section taken along line IX—IX of FIG. 8.

FIGS. 8 and 9 show a top view and a sectional view of an acceleration sensor 170 according to a fifth embodiment. Parts of the acceleration sensor 170 corresponding to the parts of the acceleration sensor 110 of FIGS. 2 and 3 bear the same reference numerals.

In the embodiment of FIGS. 8 and 9, one of the ends of the lightguides, namely that of the input lightguide 114, is arranged to be displaceable in the direction of the optical axis 126 connecting the two lightguide ends 114a, 116a. For this purpose, the end 114a of the input lightguide 114 is positioned and affixed at a holding element 172 guided in the direction of the optical axis 126 to be longitudinally displaceable between two guide rails 174. A fixed holding element 176 is mounted at the end of the guide rail 174 lying in opposition to the holding element 172; this holding element 176 retains the end 116a of the output lightguide 116 in its position. A helical spring 178 is arranged between the two holding elements 172, 176. In case of acceleration forces acting in the direction of arrow 179 on the displaceable holding element 172, the latter is shifted against tie bias of the spring 178 toward the end 116a of the output lightguide 116. Depending on the size of the mutual distance between the two lightguide ends 114a, 116a, more or less light from the input lightguide 114 passes to the output lightguide 116. The intensity of the light from the output lightguide 116 is thus a measure for the effective acceleration. The degree of efficiency of the step of coupling the light in and out is considerably enhanced by the use of an additional imaging optic system in the form of two lenses formed by an appropriate spherical configuration of the end faces 114b, 116b of the lightguide ends 114a, 116a, once the holding element 172 for the movable end 114a of the input lightguide 114 has reached a certain shifted position, i.e. when a specific minimum acceleration acts on the holding element 172.

Figure 10:
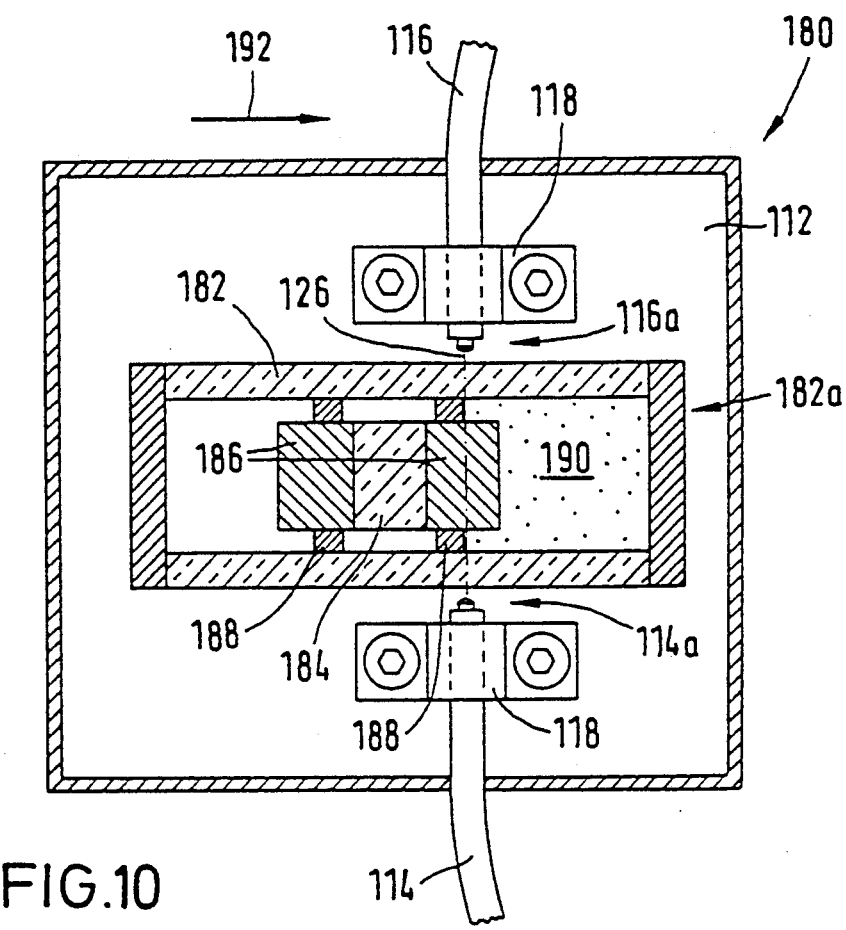
FIG. 10 shows, in top view, a sixth embodiment of the acceleration sensor.

A sixth embodiment of an acceleration sensor 180 is represented schematically in FIG. 10. Insofar as possible, the parts of the acceleration sensor 180 corresponding to the parts of the acceleration sensor 110 of FIGS. 2 and 3 are denoted by the same reference numerals in FIG. 10. According to FIG. 10, a "pneumatic spring" is utilized for providing the restoring force in the acceleration sensor 180 according to FIG. 10 in place of the mechanical restoring springs for the respectively movable element of the spring-mass system utilized in the acceleration sensors of the previous embodiments. A hollow-cylindrical glass member 182 with at least one end face 182a, sealed gastight, is arranged between the two ends 114a, 116a of the lightguides 114, 116 lying in mutual opposition on the joint or common optical axis 126. An optical element 184, for example in the shape of a transparent glass part,is located within the glass member 182. The optical element 184 is retained by two holding parts 186 in contact by way of sealing rings 188 with the inner surface of the hollow-cylindrical glass member 182 and being guided at that location. The sealing rings 188 terminate flush with the inner surface of the glass member 182 in gastight fashion. The space 190 between the end faces 182a, is sealed gastight, and the holding member 186 facing these end faces is filled with a gas.

FIG. 10 shows the relationships for the case wherein no acceleration forces act on the optical element 184 with the holding member 186. In this condition, the optical element 184 occupies a position outside of the optical axis 126 between the two lightguide ends 114a, 116a. One of the nontransparent holding members 186 intersects the optical axis 126 s that the output lightguide 116 is shielded from the light emanating from the input lightguide 114. In case acceleration forces act on the optical element 184 and its holding members 186 in the direction of the arrow 192, the optical element 184 shifts within the hollow-cylindrical glass member 182 because, via the sealing rings 188, the holding members 186 of the optical element 184 are in slidingly displaceable contact with the inner surface of the glass member 182. The optical element 184 thus moves in the direction of arrow 192, the gas in space 190 being thereby compressed. If the acceleration is of adequate magnitude, the optical element 184 is moved against the rising pressure of the gas in space 190 to such an extent that the optical element 184 lies on the optical axis 126, i.e. light from the input lightguide is coupled into the output lightguide 116 through the hollow-cylindrical glass member 182 and the optical element 184.

What is claimed is:

1. A passive safety device for an airbag system for protecting occupants of a vehicle from injuries during accidents which comprises a sensor unit for detecting the vehicle accelerations and decelerations; an evaluating unit connected to the sensor unit for evaluating an output signal of the sensor unit; and a triggering unit connected to the evaluating unit for activating the airbag system upon the reception of a trigger signal to protect the occupants from injuries, wherein the output signal of the sensor unit and the trigger signal for the triggering unit are each an optical light signal, and the sensor unit, the evaluating unit and the triggering unit are connected via lightguides; the sensor unit comprising an optical unit for producing the optical output signal corresponding to a detected acceleration or deceleration.

2. A device according to claim 1, wherein the sensor unit is provided with an optical unit for the production of an optical output signal corresponding to a detected acceleration or deceleration.

3. A device according to claim 2, wherein the optical unit of the sensor unit comprises an optical filter element having variable transmission properties, a light-transmitting means connected in front of an input of the optical filter element, and a light-receiving means connected after an output of the optical filter element; the optical filter element being arranged to be movable in such a way that the element moves, for varying its transmission properties, in dependence on the extent of acceleration or deceleration of the vehicle, relatively to an optical axis between the light-transmitting means and the light-receiving means.

4. A device according to claim 3, wherein the sensor unit comprises a spring-mass system having a spring element and an inertial mass member coupled with the spring element and deflectable upon acceleration or deceleration of the vehicle; the mass member being coupled with the optical filter element.

5. A device according to claim 3, wherein the sensor unit further comprises a spring-mass system having a spring element wherein the spring element is coupled with the optical filter element forming an inertial mass member of the spring-mass system.

6. A device according to any one of claims 3 to 5, wherein the optical filter element exhibits, as seen in a transverse direction to the optical axis, regionally differing transmission properties, and the optical filter element is movable transversely to the optical axis.

7. A device according to claim 6 wherein the optical filter element is constructed so that its transmission properties vary continuously or stepwise.

8. A device according to claim 3, wherein the light transmitting means comprises a first lightguide, the light receiving means comprises a second lightguide, and the optical filter element is arranged in a beam path between a first lightguide conducting light to the optical filter element, and the second lightguide receiving the light leaving the optical filter element and further conducting this light.

9. A device according to claim 8, wherein, as a consequence of the transmission properties of the optical filter element which vary in dependence on the acceleration or the deceleration, the intensity of the light exiting from said filter element is with constant intensity of the impinging light, changed in correspondence with the acceleration of deceleration.

10. A device according to claim 9, wherein a measure for the acceleration or deceleration can be determined from the intensity difference between the light fed to the optical filter element and the light exiting from the optical filter element.

11. A device according to claim 1, wherein the evaluating unit has a light source, light from the source being transmitted via a first lightguide to the optical unit of the sensor unit, and light from the light source converted by the optical unit in dependence of the acceleration or deceleration is fed via a second lightguide to the evaluating unit.

12. A device according to claim 11, wherein the evaluating unit comprises a comparator which compares a signal representing the intensity of the light from the light source with a signal representing the intensity of the light of the second lightguide and which, based on the comparison, yields an output signal representing the extent of acceleration or deceleration.

13. A device according to claim 12, wherein the evaluating unit, upon reaching or exceeding or falling below a predetermined acceleration value, transmits to the triggering unit the trigger signal for the activation of the occupant protection system.

14. A device according to claim 13, wherein the trigger signal is given as soon as the output signal of the sensor unit and of the evaluating unit represents a light intensity difference larger than or equal to a predetermined first threshold value, or smaller than a predetermined second threshold value.

15. A device according to one of claim 1, wherein the triggering unit comprises a triggering arrangement for activation of the occupant protection system, and a monitoring unit for monitoring the triggering arrangement for possible operational defects.

16. A passive safety device for an airbag system for protecting occupants of a vehicle from injuries during accidents which comprises a sensor unit for detecting the vehicle accelerations and decelerations; an evaluating unit connected to the sensor unit for evaluating an output signal of the sensor unit; and a triggering unit connected to the evaluating unit for activating the airbag system upon the reception of a trigger signal to protect the occupants from injuries, wherein the output signal of the sensor unit and the trigger signal for the triggering unit are each an optical light signal, and the sensor unit, the evaluating unit and the triggering unit are connected via lightguides; the sensor unit comprises an optical unit for producing the optical output signal corresponding to a detected acceleration or deceleration, the evaluating unit having a light source, light from the light source being transmitted via a first lightguide to the optical unit of the sensor unit, and light from the light source converted by the optical unit in dependence on the acceleration or deceleration being fed via a second lightguide to the evaluating unit, and the triggering unit comprises a triggering arrangement for actuation of the airbag system and a monitoring unit for monitoring the triggering arrangement for possible operational defects and wherein a light signal is transmitted to the triggering unit for monitoring the triggering unit by way of a third lightguide, via a fifth lightguide, a light signal from the triggering unit is transmitted to the evaluating unit corresponding to the light signal of the third lightguide, the evaluating unit checking, with the aid of the light from the fifth lightguide, whether the triggering arrangement is intact and free of operational defects.

17. A device according to claim 16, wherein a fourth lightguide is arranged between the light source of the evaluating unit and the optical unit, the light from this lightguide that passes through the optical unit being transmitted as a light signal via the third lightguide to the triggering unit.

18. A device according to claim 17, wherein said triggering unit comprises a triggering arrangement, an opto-electrical transducer for converting a light signal into an electrical output signal and a light source connected in series with said transducer and the triggering arrangement, the light signal of the third lightguide transmitted to the triggering unit being converted into an electrical signal by said transducer so that the light source connected thereto is operated, the light from this light source being fed via a fifth lightguide to the evaluating unit, wherein the electrical signal is chosen so that the triggering arrangement does not activate the occupant protection system during a monitoring operation.

19. A device according to claim 18, wherein the triggering arrangement activates the occupan protection device in response to another electrical signal resulting from an optical trigger signal of greater intensity than that received during the monitoring operation, said optical trigger signal being generated by the evaluating unit when the acceleration or deceleration is at least equal to a predetermined threshold value.

20. A device according to claim 19, characterized in that the triggering unit also comprises an energy storage means, and the energy storage means in response to the optical trigger signal is coupled with the triggering arrangement and transmits its stored energy to the triggering arrangement to effect activation of the occupant protection system.

21. A device according to claim 20, wherein an electrical signal converted in the triggering unit upon receiving the optical light signal of the third lightguide can be fed to the energy storage means for the storing of energy.

22. A method for optically triggering a passive safety device for an airbag system for protecting the occupants of a vehicle from injuries during accidents, wherein acceleration or deceleration of the vehicle is determined by a sensor unit transmitting an output signal corresponding to a measured value, and a trigger signal for activation of the airbag system is applied to a triggering unit arranged separately from the sensor unit in case the acceleration or deceleration corresponding to the output signal of the sensor unit reaches or exceeds or falls below a predetermined threshold value, said method being characterized in that, for activation of the airbag system, an optical light signal is produced as the trigger signal, said optical light signal being fed to the triggering unit by way of an optical lightguide and an optical light signal is produced as the output signal of said sensor unit and is transmitted via an optical lightguide to an evaluating unit arranged separately from the sensor unit and the triggering unit.

23. A method according to claim 22 characterized in that the light intensity of the optical output signal of the sensor unit is variable in dependence on the acceleration or deceleration.

24. A method according to claim 23, characterized in that an optical light signal is fed to the sensor unit, the light intensity of this signal being varied by an optical unit in dependence on the acceleration or deceleration, and that the acceleration or deceleration is determined with the aid of the light intensity difference 25. A method according to claim 22, characterized in that an optical light signal is transmitted for monitoring purposes to the triggering unit, the light intensity of this signal being selected so that the triggering unit does not activate the occupant protection system, and that another optical light signal corresponding to the optical light signal received by the triggering unit is transmitted from the triggering unit to the evaluating unit, the functional ability of the triggering unit being checked with the aid of the another light signal.

26. A method according to claim 22, characterized in that the monitoring light signal and the trigger signal are applied to the triggering unit by way of a lightguide.

27. A method according to claim 26, characterized in that the light intensities of the monitoring signal and the trigger signal are different.

28. An optomechanical acceleration sensor in a vehicle for activating an airbag system for protecting the occupants of the vehicle from injuries during accidents which comprises an optical input lightguide, an optical output lightguide, and a light transmission device for transmitting an incident light of the input lightguide to the output lightguide, wherein the light transmission device comprises a spring-mass system that is movable upon the occurrence of accelerations of the vehicle and, with no acceleration being effective, is in a starting position or is converted into the latter, the light transmission properties of the light transmission device varying in dependence on its movement or extent of movement in such a way that light fed into the output lightguide is a measure of the effective acceleration of the vehicle.

29. An optomechanical acceleration sensor according to claim 28, wherein the light transmission device is mounted in a spring-elastic fashion.

30. An optomechanical acceleration sensor according to claim 28, wherein the two lightguides are arranged with their ends in mutual opposition and at a spacing from each other; said spring-mass system comprising a spring-elastically mounted optical element which is guided so that the element is movable in the direction of a spring force as well as in opposition thereto and which is arranged between the ends of the two lightguides and is movable into and out of an interspace between the ends of the two lightguides.

31. An optomechanical acceleration sensor according to claim 30, wherein the optical element, as seen in the direction of movement, exhibits regionally differing transmission properties, preferably a rising or falling degree of transmission.

32. An optomechanical acceleration sensor according to claim 31, wherein the optical element is fashioned as an optical neutral wedge, as an opaque, plate-shaped element with one or several holes, slots, gaps, in each case in wedge shape, or as an optical step filter.

33. An optomechanical acceleration sensor according to claim 32, characterized in that the step filter comprises as a glass plate, one half of which is designed as a 50% transmission filter and the other half of which consists of a material having essentially a transmission factor of close to 1.

34. An optomechanical acceleration sensor according to claim 28, wherein the light transmission device comprises a light-bending unit onto which inpinges light of the input lightguide, and the light-bending unit is movable in dependence on the acceleration and, upon the effect of an acceleration higher than a predetermined threshold value, deflects, in one movement position, the light coming from the input lightguide toward the output lightguide.

35. An optomechanical acceleration sensor according to claim 34, wherein the light-bending unit is a rotatable reflection mirror.

36. An optomechanical acceleration sensor according to claim 34, wherein the light-bending unit comprises a rotatable, light-transmitting optical element which, in dependence on its rotary position, totally reflects an impinging light of the input lightguide and transmits the light same to the output lightguide.

37. An optomechanical acceleration sensor according to any one of claims 34 to 36, wherein a restoring force or a spring acts on the light-bending unit for turning the light-bending unit back into the starting position with the acceleration being no longer effective, and for retaining the light-bending unit in the starting position.

38. An optomechanical acceleration sensor according to claim 28 or 29, wherein the light transmission device comprises a lens system displaceable in a longitudinal fashion along an optical axis between the ends of the two lightguides.

39. An optomechanical acceleration sensor according to claim 38, wherein the lens system is retained by a displaceably guided holding element on which acts a restoring force for turning the lens system back into the starting position with the acceleration being no longer effective, and for retaining the lens system in the starting position.

40. An optomechanical acceleration sensor according to claim 38, wherein the lens system, upon the occurrence of an acceleration, the magnitude of which is larger than or equal to a predetermined threshold value, is moved into a shifted position and, depending on the extent of acceleration, beyond such position, so that light passing through the lens system is focused onto the end of the output lightguide.

41. An optomechanical acceleration sensor according to claim 28, wherein the light transmission device comprises a holding element movable toward and away from the end of the output lightguide, the end of the input lightguide being affixed to this holding element; and means for providing a restoring force that acts on the holding element for moving the holding element back into the starting position with no acceleration being effective, and for retaining the holding element in the starting position.

42. An optomechanical acceleration sensor according to claim 41, wherein the ends of the two lightguides are arranged on a common optical axis; and the holding element for the end of the input lightguide is movable forwards and backwards along the optical axis.

43. An optomechanical acceleration sensor according to claim 28, wherein the light transmission device further comprises a hollow cylinder with a light-transmitting mantle arranged between the ends of the two lightguides; an optical element is arranged within the hollow cylinder in gas-tight contact with a surface of the inner cylinder, said element being slidingly displaceable in the hollow cylinder along a longitudinal axis of the hollow cylinder; and at least the end face of the hollow cylinder is sealed in gastight fashion, and a space between the sealed end face and the optical element is filled with a gas.

44. An optomechanical acceleration sensor according to claim 43, wherein, for producing the restoring force, at least one of a mechanical spring device and a pneumatic spring device is provided for said spring-mass system.

45. An optomechanical acceleration sensor according to claim 28, wherein, respectively, one imaging optic is arranged at the ends of the two lightguides.

46. An optomechanical acceleration sensor according to claim 45, wherein the imaging optics comprise lens systems.

47. An optomechanical acceleration sensor according to claim 46, wherein the end faces of the ends of the two lightguides are formed into lenses.

* * * * *